July 11, 1939.  C. A. CAMPBELL ET AL  2,165,611

POP VALVE

Filed Sept. 1, 1937

Inventor
Charles A. Campbell
Lewis A. Safford

Attorneys

Patented July 11, 1939

2,165,611

UNITED STATES PATENT OFFICE 2,165,611

POP VALVE

Charles A. Campbell and Lewis A. Safford, Watertown, N. Y., assignors to The New York Air Brake Company, a corporation of New Jersey Application September 1, 1937, Serial No. 162,035

10 Claims. (Cl. 137—53)

This invention relates to pressure relief valves, and particularly to so-called pop-valves used in the air brake art.

In pressure relief valves in which a metallic poppet valve coacts with a metallic seat it is desirable that the valve open sharply when a definite pressure is attained, and close sharply after a definite blow-down has occurred. It is desirable to provide means to adjust the amount of blow-down. The amount of blow-down, under given conditions of pressure rise, is reflected in the frequency of opening and closing.

Pop-valves have heretofore been known in which a reaction pocket charged by initial opening of the valve is connected by a bypass port in the valve housing with the space behind the valve, such space being vented to atmosphere through adjustable vents. Opening movement of the valve throttles the bypass port to some degree. Valves of this type are often unstable, particularly when set for a low blow-down, and tend to "hum", opening and closing continually.

The present invention produces a valve which has greater discharge capacity and decidedly sharper pop action, both opening and closing, than have valves heretofore used. Furthermore the improved valve has a satisfactory pop action even for small discharge rates and consequently is stable over a much wider range of operation. It is practically devoid of any tendency to hum. A further advantage is that it is less expensive to manufacture.

Conspicuous structural differences are that the bypass ports are formed in the valve rather than in the housing and are comparatively large and the main discharge ports are wide and hence have a rapid opening characteristic, and the scale of the closing spring is small, reliance being placed on pneumatic pressure, rather than increasing spring resistance to initiate the closing movement.

The invention will now be described in connection with the accompanying drawing which shows an embodiment characterized by exceptionally good operating characteristics.

Figure 1:
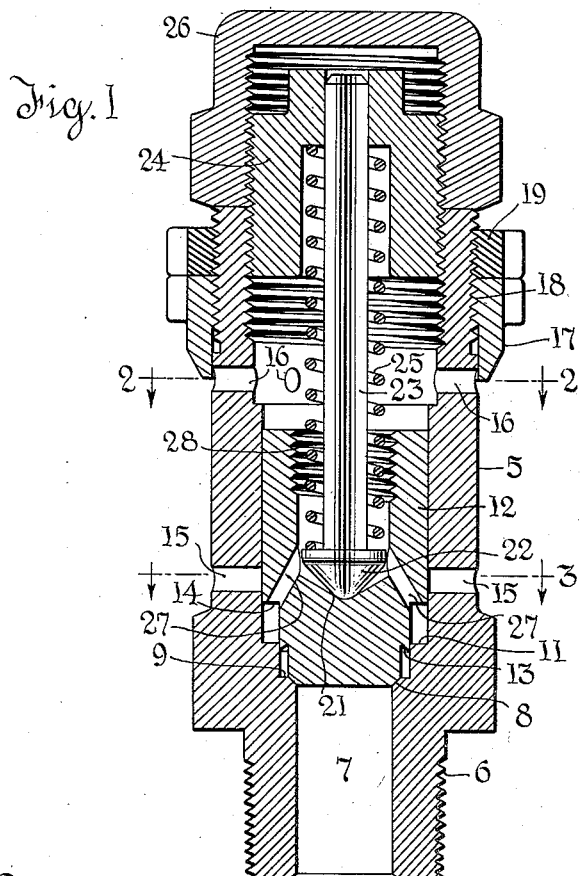
Fig. 1 is a vertical axial section of the complete valve.

The body 5 of the valve has a pipe-threaded nipple 6 for attachment to the device to be vented.

The vent passage 7 leads to a conical valve seat 8. The body 5 is counterbored from its upper end to form two annular shoulders 9 and 11 near the seat 8.

The shoulder 9 which surrounds the upper margin of the seat is relatively narrow but the shoulder 11 is approximately twice as wide. Guided in the counterbore which forms shoulder 11 is the valve element 12. This has a conical or beveled end which mates with the seat 8, and an undercut shoulder 13 which enters a short distance into the counterbore above shoulder 9, when the valve is seated.

Figure 2:
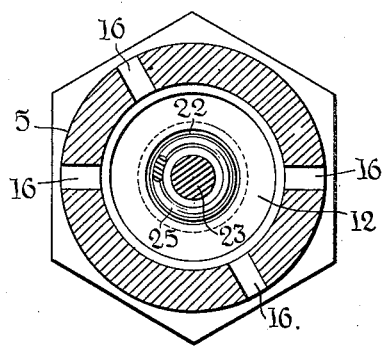
Fig. 2 is a transverse section on the line 2—2 of Fig. 1.
Figure 3:
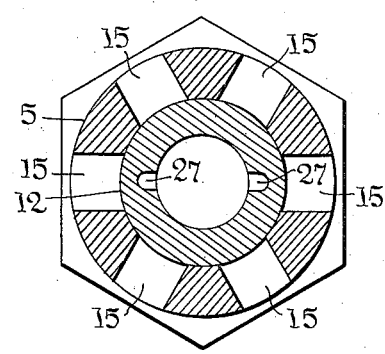
Fig. 3 is a similar section on the line 3—3 of Fig. 1.

Above this is a second shoulder 14, which, when the valve 12 is seated, is below the six main discharge ports 15 (see Fig. 3). The ports are so dimensioned that as valve 12 rises from its seat, the unseating of the valve first admits discharging air under shoulder 13. Next shoulder 13 clears shoulder 11, admitting discharging air under shoulder 14. Shortly thereafter shoulder 14 starts to expose the main discharge ports 15. Above the upper limit of travel of valve 12 are four vent ports 16 (see Fig. 2). These may be throttled more or less by adjusting the throttling ring 17 which is threaded at 18 on the upper end of body 5 and is locked by ring 19 also threaded on the body.

The valve 12 is counterbored from its upper end, the counterbore terminating in a conoidal socket 21 for the head 22 of thrust stem 23. Stem 23 is guided at its upper end in a combined guide and adjustable spring seat 24 threaded into the upper end of housing 5. A coil compression spring 25 surrounds stem 23 and reacting between head 22 and seat 24 urges the valve 12 in a closing direction. Spring seat 24 is locked in adjusted positions and the upper end of body 5 is sealed by cap 26 threaded onto the projecting portion of spring seat 24.

Leading from shoulder 14 on valve 12 to the counterbore, and hence to the space above valve 12, are two oblique ports 27 of substantial size. The facts that these ports are straight, are in the valve itself, and are not throttled by opening movement of the valve, are marked distinctions from prior valves of this class.

Figure 4:
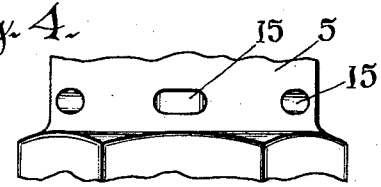
Fig. 4 is a fragmentary elevation showing the form of the main discharge ports.

Consideration of Fig. 4 will make clear that ports 15 are oval in form, having a width greater than their height, so that they open rapidly, as the valve lifts, and consequently do not throttle very markedly until the valve is very nearly closed. From this it follows that on the closing movement throttling of flow does not start until the pressure closely approaches the setting of the valve. The ports subtend more than half the circumference of the valve.

The threads 28 in the upper end of the counterbore, are merely to receive a valve pulling tool, and have no significance in the operation of the valve.

The operation can now be explained.

Consider the valve in its closed position as shown in Fig. 1. The space behind (above) the valve is vented to atmosphere by the ports 16 and hence this space as well as the spaces between shoulders 11 and 14 and between shoulders 9 and 13 are at atmospheric pressure. If the air pressure in passage 7 acting on the relatively small area of the valve exposed thereto rises sufficiently to overpower spring 25, the valve starts to open.

Initial opening movement increases the effective area on which discharging pressure fluid acts to that within the outer circumference of shoulder 13 and before ports 15 are exposed the effective area is further increased to that within the outer circumference of shoulder 14. Thus an increasing opening tendency is developed, but before ports 15 start to open, flow starts through ports 27 to the space behind (above) the valve, so that pressure starts to build up behind the valve. When ports 15 open they open rapidly and their venting effect ensures after a short time interval a sharp closing movement of the valve without attendant development of pronounced throttling action prior to final closure. The adjustment of ring 17, to throttle ports 16 more or less, determines the time interval before closing motion starts. The smaller the venting effect of ports 16 the more prompt the closing movement. Control by ring 17 is made more effective by using a spring 25 of low scale, i. e., a spring whose stress increases slowly in proportion to compression. Thus the closing movement is initiated by air pressure developing behind the valve, assisted only moderately by increased stress developed in the spring by the opening movement. Furthermore, the low scale spring in conjunction with the wide ports 15 are factors in sharp closure without substantial throttling of ports 15 prior to closure.

Pop valves of the prior art which operate satisfactorily when pressure rises rapidly, often hum when pressure rises very slowly above the setting of the valve. Shoulder 13 and its location such that it clears shoulder 11 before ports 15 are exposed, prevents humming when pressure rises slowly above the valve setting. In such case with the valve here described ports 15 are not exposed at all. The entire discharge occurs through ports 27 to the space behind the valve and thence through ports 16. Development of pressure behind the valve is sufficient to ensure sharp closing (pop-action), so that bleeding or humming is not encountered even with very slow pressure rise.

This in effect the valve has two related and complementary pop-action characteristics, one effective when pressure rise is pronounced, and giving very rapid discharge, and the other effective when the pressure rise is slow and giving a slower rate of discharge. In this way satisfactory action over a wide range is had, and in all adjustments of ring 17.

Modifications are possible within the scope of the invention, and the embodiment described in detail is intended to be illustrative and not limiting.

What is claimed is:

1. The combination of a valve housing formed with guiding means, a seat and a discharge passage leading thereto; a piston-like poppet valve guided in said guiding means to move toward and from said seat; and yielding means urging said valve toward said seat, the valve being formed with reaction shoulders which are successively exposed to discharging pressure fluid as the valve opens, the housing having relief ports opened by the last exposed shoulder on further opening movement of the valve, the housing behind the valve being closed except for restricted discharge ports and the valve having at least one discharge port leading through the valve from the last exposed reaction shoulder to said space behind the valve.

2. The combination of a valve housing formed with guiding means, a seat and a discharge passage leading thereto; a piston-like poppet valve guided in said guiding means to move toward and from said seat; and yielding means urging said valve toward said seat, the valve being formed with reaction shoulders which are of successively greater area and are successively exposed to discharging pressure fluid as the valve opens, the housing having relief ports opened by the last exposed shoulder on further opening movement of the valve, the housing behind the valve being closed except for restricted discharge ports and the valve having at least one discharge port leading through the valve from the last exposed reaction shoulder to said space behind the valve.

3. The combination of a valve housing formed with guiding means, a seat and a discharge passage leading thereto; a piston-like poppet valve guided in said guiding means to move toward and from said seat; and yielding means urging said valve toward said seat, the valve having a reaction shoulder exposed to discharging pressure fluid by opening movement of the valve, and the housing having relief ports leading to atmosphere which are exposed by said shoulder on further opening movement of the valve, the housing behind the valve forming a closed chamber except for restricted discharge ports through the wall thereof, and the valve having at least one discharge port leading from the reaction shoulder through the valve to said chamber behind the valve.

4. The combination of a valve housing formed with guiding means, a seat and a discharge passage leading thereto; a piston-like poppet valve guided in said guiding means to move toward and from said seat; yielding means urging said valve toward said seat, the valve having a reaction shoulder exposed to discharging pressure fluid by opening movement of the valve, and the housing having relief ports leading to atmosphere which are exposed by said shoulder on further opening movement of the valve, the housing behind the valve forming a closed chamber except for discharge ports through the wall thereof, and the valve having at least one discharge port leading from the reaction shoulder through the valve to said chamber behind the valve; and adjustable means for throttling said discharge ports in the housing.

5. The combination defined in claim 1 in which the relief ports subtend more than half the circumference of that portion of the valve which controls said ports and are so formed as to have a rapid opening and closing characteristic.

6. The combination defined in claim 3 in which the relief ports subtend more than half the circumference of that portion of the valve which controls said ports and are so formed as to have a rapid opening and closing characteristic.

7. The combination defined in claim 1 in which the relief ports subtend more than half the circumference of that portion of the valve which controls said ports and are so formed as to have a rapid opening and closing characteristic, and the yielding means is a spring of low scale such that the closing tendency when the valve is open is developed chiefly by pneumatic pressure in the space behind the valve.

8. The combination defined in claim 2 in which the relief ports subtend more than half the circumference of that portion of the valve which controls said ports and are so formed as to have a rapid opening and closing characteristic, and the yielding means is a spring of low scale such that the closing tendency when the valve is open is developed chiefly by pneumatic pressure in the space behind the valve.

9. The combination of a valve housing formed with guiding means, a seat and a discharge passage leading thereto; a piston-like poppet valve guided in said guiding means to move toward and from said seat; and a spring urging said valve toward said seat, said spring having a strength sufficient to resist fluid pressure acting on said valve within said seat up to the value for which the valve is set, and the spring being so designed as to develop a low increase in force as an incident to opening movement of the valve, the valve being formed with reaction shoulders which are successively exposed to discharging pressure fluid as the valve opens, the housing having relief ports opened by the last exposed shoulder on further opening movement of the valve, said relief ports subtending the major portion of the circumference of said shoulder and having control edges straight throughout the major portion of their length, whereby the valve has a rapid opening and closing characteristic with respect to said ports, the housing behind the valve being closed except for means affording a restricted discharge flow, and the valve having at least one discharge port leading through the valve from one of said reaction shoulders to said space behind the valve.

10. The combination of a valve housing formed with guiding means, a seat and a discharge passage leading thereto; a piston-like poppet valve guided in said guiding means to move toward and from said seat; and yielding means urging said valve toward said seat, the valve being formed with two reaction shoulders which are successively exposed to discharging pressure fluid as the valve opens, the housing having relief ports opened by the last exposed shoulder on further opening movement of the valve, the housing behind the valve being closed except for restricted discharge ports and there being at least one flow passage effective when the second reaction shoulder is exposed to discharging pressure fluid to conduct at least a part of said pressure fluid to the space behind the valve.

CHARLES A. CAMPBELL.
LEWIS A. SAFFORD.